(12) United States Patent
Alvarino

(10) Patent No.: US 8,448,978 B2
(45) Date of Patent: May 28, 2013

(54) FOLDABLE UTILITY TRAILER

(75) Inventor: Leonardo E. Alvarino, Oakville (CA)

(73) Assignee: Inca Industries Inc., Oakville, Ontario (CA)

(*) Notice: Subject to any disclaimer, the term of this patent is extended or adjusted under 35 U.S.C. 154(b) by 194 days.

(21) Appl. No.: 12/825,412

(22) Filed: Jun. 29, 2010

(65) Prior Publication Data

US 2011/0204601 A1 Aug. 25, 2011

(30) Foreign Application Priority Data

Feb. 23, 2010 (CA) .................................... 2692168

(51) Int. Cl.
B62B 1/20 (2006.01)
B62D 63/06 (2006.01)
B62D 21/14 (2006.01)

(52) U.S. Cl.
CPC .............. *B62D 63/061* (2013.01); *B62D 21/14* (2013.01); *B62D 63/067* (2013.01)
USPC ........... 280/656; 280/638; 280/639; 280/651; 280/652

(58) Field of Classification Search
USPC ........................... 280/638, 639, 651, 652, 656
See application file for complete search history.

(56) References Cited

U.S. PATENT DOCUMENTS

| 1,471,479 | A | * | 10/1923 | Gleissner | ................... | 296/181.7 |
| 4,239,258 | A | | 12/1980 | Burris | | |
| 4,758,008 | A | | 7/1988 | Moddejonge | | |
| 4,786,073 | A | | 11/1988 | Harper | | |
| 6,846,003 | B2 | | 1/2005 | Thompson | | |
| 7,052,033 | B2 | * | 5/2006 | McDonell | ...................... | 280/656 |
| 7,651,117 | B1 | * | 1/2010 | McGee | .......................... | 280/656 |
| 2003/0102655 | A1 | | 6/2003 | Thompson | | |
| 2009/0134605 | A1 | | 5/2009 | Norton | | |

FOREIGN PATENT DOCUMENTS

| GB | 2267468 A | 12/1993 |
| GB | 2361460 A | 10/2001 |
| WO | 2006045155 A1 | 5/2006 |

OTHER PUBLICATIONS

PCT International Search Report in PCT/CA2010/001879 dated Feb. 11, 2011.
Canadian Office Action in CA 2708709 dated Feb. 24, 2011.

* cited by examiner

*Primary Examiner* — J. Allen Shriver, II
(74) *Attorney, Agent, or Firm* — Manelli Selter PLLC; Edward J. Stemberger

(57) ABSTRACT

A collapsible foldable utility trailer for the transportation and/or storage of objects, the trailer comprising a supporting chassis frame; suspension for supporting the chassis frame; and a trailer bed retained upon the chassis frame and comprising a plurality of bed sections comprising a first bed section and a second bed section wherein a second planar bed member in the second bed section is hingedly connected between a pair of opposing second bed side walls to a first planar bed member in the first bed section between a pair of opposing first bed side walls so as to allow 90° rotation of the second bed section to effect abutment with the first bed section. A large folding trailer that can be used at full size, or be folded to be used as a short trailer, or folded again for storage.

8 Claims, 3 Drawing Sheets

Large Trailer

Short Trailer

Stored Trailer

FOLDABLE UTILITY TRAILER

FIELD OF THE INVENTION

The invention relates to a utility trailer for the transportation and storage of goods and articles that can be used using its full bed length as a large trailer when it is necessary, or which can be folded and used as a short trailer and easier to pull. It can be further folded to a minimum length when it is desired to store objects.

BACKGROUND OF THE INVENTION

While utility trailers are most useful for moving objects, goods, articles and other merchandise, they have two big inconveniences and disadvantages. Pulling trailers, generally, by cars or pick-up trucks is not easy, especially when moving backwards or parking. This inconvenience is increased as the trailer becomes bigger. Further, a relatively big space is necessary to store them.

The market offers a huge variety of trailers, for almost all needs. There are manufacturing factories if a custom designed trailer is needed whereby people can choose between large and smaller trailers depending on what is needed to be hauled.

Typically, utility trailers have a fixed bed that cannot be changed unless parts are added or removed.

If people or industries need a trailer and haven't enough room for storing it, they can currently choose trailers that fold to decreased their storage size. However, they cannot be used in their folded states to transport or store merchandise.

Accordingly, there is a need for a trailer that can be used as a large trailer or readily modified to a shorter trailer, and vise versa.

SUMMARY OF THE INVENTION

The present invention provides a market need for a trailer that allows of the variable selection between a large or short trailer as well as the need to fold the trailer for storage while not losing the merchandise storage condition.

In one broad aspect, the invention provides a collapsible, foldable utility trailer for the transportation and/or storage of objects, said trailer comprising
  a supporting chassis frame;
  suspension means for supporting said chassis frame;
  bed means retained upon said chassis frame for receiving said objects and comprising a plurality of bed sections comprising
  (a) a first bed section having
    i) a first planar bed member for receiving an object thereupon;
    ii) a pair of opposing first bed side walls mounted on said first bed member;
  (b) a second bed section having
    i) a second planar bed member for receiving an object thereupon;
    ii) a pair of opposing second bed side walls mounted on said second bed member;
    iii) a second bed end wall mounted to said second bed member between said pair of opposing second bed side walls;
    wherein said second planar bed member is hingedly connected between said pair of opposing second bed side walls to said first planar bed member between said pair of opposing first bed side walls to allow 90° rotation of said second bed section to effect abutment with said first bed section.

In a further embodiment the invention provides a trailer as hereinabove defined wherein said bed means comprises
  (c) a third bed section having
    i) a third planar bed member for receiving an object thereupon;
    ii) a pair of opposing third bed side walls mounted on said third bed member;
    iii) a third bed end wall mounted to said third bed member between said pair of opposing third bed side walls;
    wherein said third planar bed member is hingedly connected between said pair of opposing third bed side walls to said first planar bed member between said pair of opposing first bed side walls to allow 90° rotation of said third bed section to effect abutment with said first bed section.

In a yet further embodiment the invention provides a trailer as hereinabove defined comprising
  a traction frame connected to said chassis frame and connectable to transport means by which said trailer is operably moved.

In a further embodiment the invention provides a trailer as hereinabove defined wherein said traction frame comprises retractable, telescopic traction means.

In a further embodiment the invention provides a trailer as hereinabove defined wherein said suspension means comprises biasing means, axle means and wheels.

In a further embodiment the invention provides a trailer as hereinabove defined wherein said chassis frame comprises
  a main support frame and an extension support frame retractable within said main support frame;
  wherein said first bed section is retained on said main support frame and said second bed section is retained (i) on said extension support frame when said trailer is in an extended mode; and (ii) is retained on said main support frame when in a collapsed mode.

In a further embodiment the invention provides a trailer as hereinabove defined wherein said pair of opposing first bed side walls are hingedly mounted on said first bed member as to be operably rotatable 90° to effect said first bed side walls in full abutment with and upon said first planar bed member.

In a further embodiment the invention provides a trailer as hereinabove defined wherein said second bed end wall constitutes (i) the rear end of said trailer when said trailer is in an extended mode; and (ii) comprises an operable top of said trailer when said trailer is in a collapsed mode.

In a yet further embodiment the invention provides a trailer as hereinabove defined wherein said third bed end wall constitutes (i) the front end of said trailer when said trailer is in an extended mode; and (ii) comprises an operable top of said trailer when said trailer is in a collapsed mode.

BRIEF DESCRIPTION OF THE DRAWINGS

In order that the invention may be better understood, preferred embodiments will now be described, by way of example only, with reference to the accompanying drawings wherein.

DETAILED DESCRIPTION OF PREFERRED EMBODIMENTS

Figure 1:
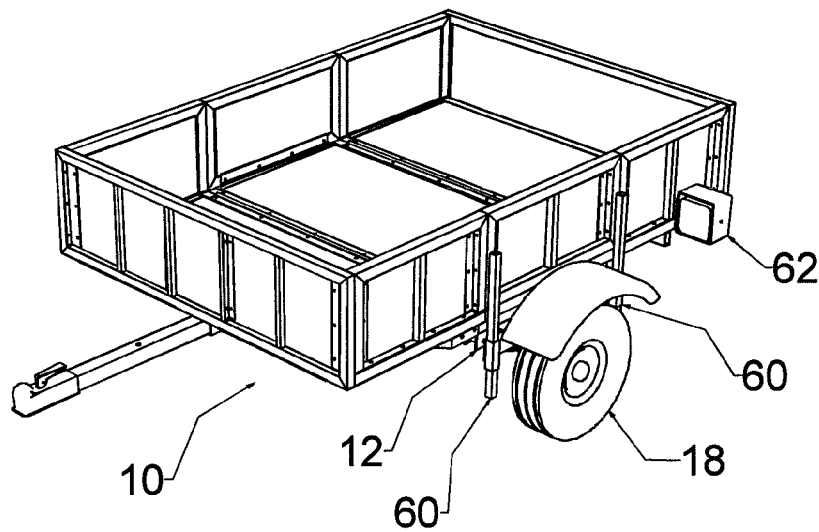
FIG. 1 is a diagrammatic perspective view of a trailer according to the invention in the larger transporting mode.
Figure 2:
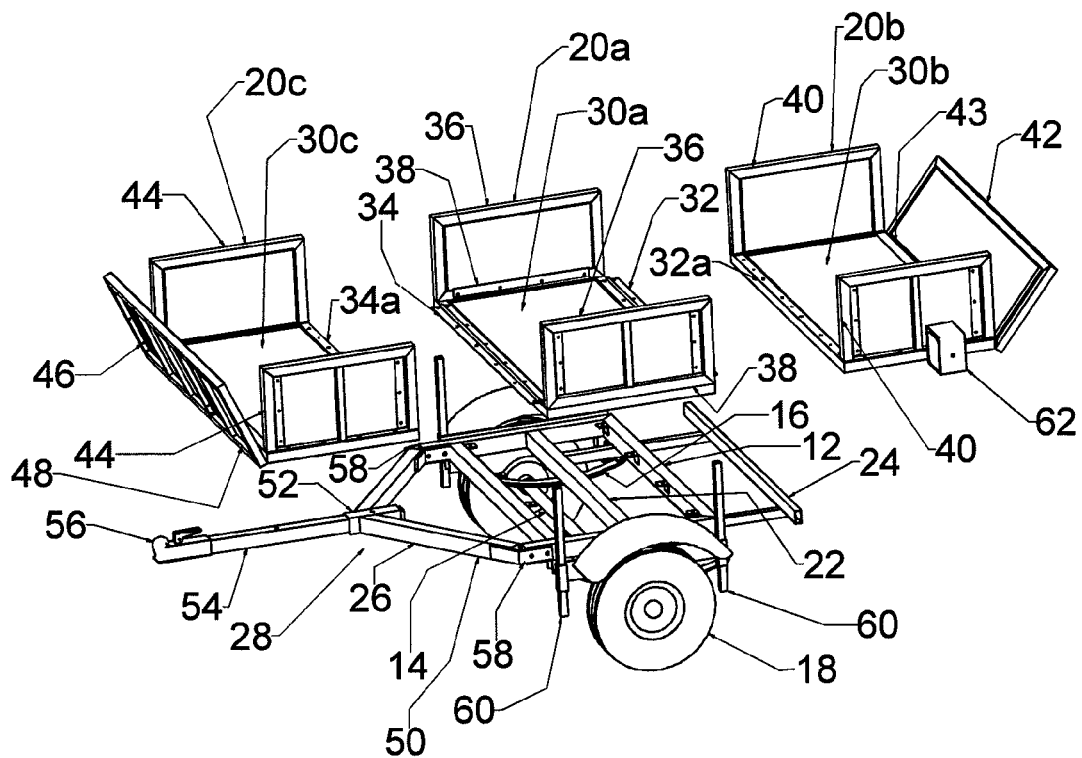
FIG. 2 is an exploded view of a trailer shown in FIG. 1.
Figure 3:
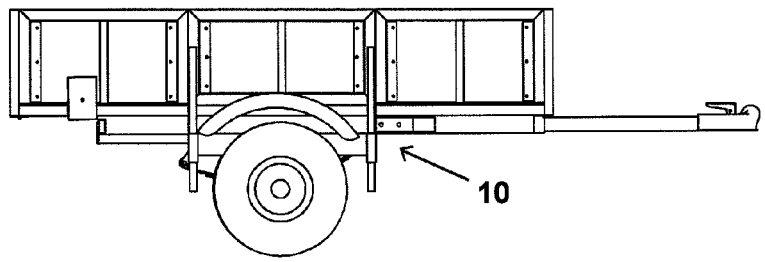
FIG. 3 is a vertical side view of a trailer in the larger transporting mode according to the invention.
Figure 4:
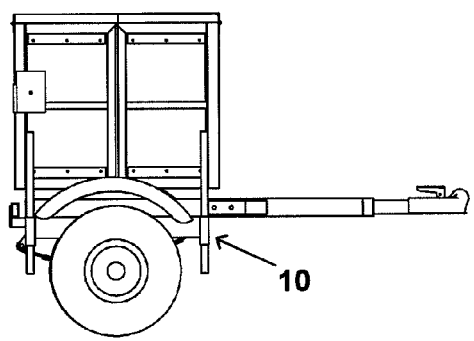
FIG. 4 is a vertical side view of a trailer in the smaller transporting mode according to the invention.
Figure 5:
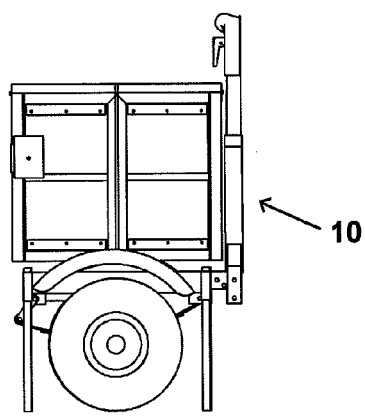
FIG. 5 is a vertical side view of a trailer in the stationery stored mode according to the invention.

With reference to FIG. 1 this shows generally as 10 a trailer having a goods supporting chassis frame 12, supported on axle 14, leaf spring 16 on wheels 18. Chassis frame 12 supports a first bed section 20a, a second bed section 20b and a third bed section 20c. Chassis frame 12 is made up of a main support frame 22 upon which bed section 20a is retained, an extension support frame 24 retractable within main support 22 and upon which second bed section 20b is retained, and a traction frame portion 26 of traction frame shown generally as 28 upon which third bed section 20c is retained.

Bed sections 20a, 20b and 20c have planar bed members 30a, 30b and 30c, respectively, upon which objects, merchandise and articles may be retained. Bed member 30a is hingedly connected by hinges 32 and 34 respectively to bed members 30b and 30c, respectively, by hinges 32a and 34a, respectively.

Bed section 20a has a pair of opposing side walls 36 hingedly mounted by hinges 38 to bed member 30a. Side walls 36 may be rigidly fixed upright or laid horizontally upon bed member 30a when desired by rotation through 90°. In alternative embodiments, side walls 36 may be alternatively retained vertically to bed member 30a and physically removed therefrom, when desired.

Bed section 20b has a pair of opposing side walls 40 mounted to bed member 30b and an end wall 42 hingedly mounted by hinge 43 to bed member 30b.

Bed section 20c has a pair of opposing side walls 44 mounted to bed member 30c and an end wall 46 hingedly mounted to bed member 30c by hinge 48.

Traction frame 28 is of a tubular structure having a Y-shaped portion 50 having at its proximal end 52 adjacent traction bar 54 by which trailer 10 is pulled via retaining knob 56 hitched to a transport vehicle.

Y-shaped portion 50 at each of its distal ends is rotatably mounted to chassis frame 12. Vertical rotation of traction frame 28 at distal ends 58 enables traction frame 28 to be vertically aligned adjacent the underside of bed member 30c when trailer is in the collapsed, folded storage mode.

Trailer 10 has a set of four adjustable legs 60 to stabilize trailer 10 when in a stationery mode not connected to a vehicle.

Most preferably, bed sections 30a, 30b and 30c are of the same width, i.e. in the axle direction.

Trailer 10 has suitably located lights 62 rotatable through 90° in order to face backwards before and after folding.

Figure 6:
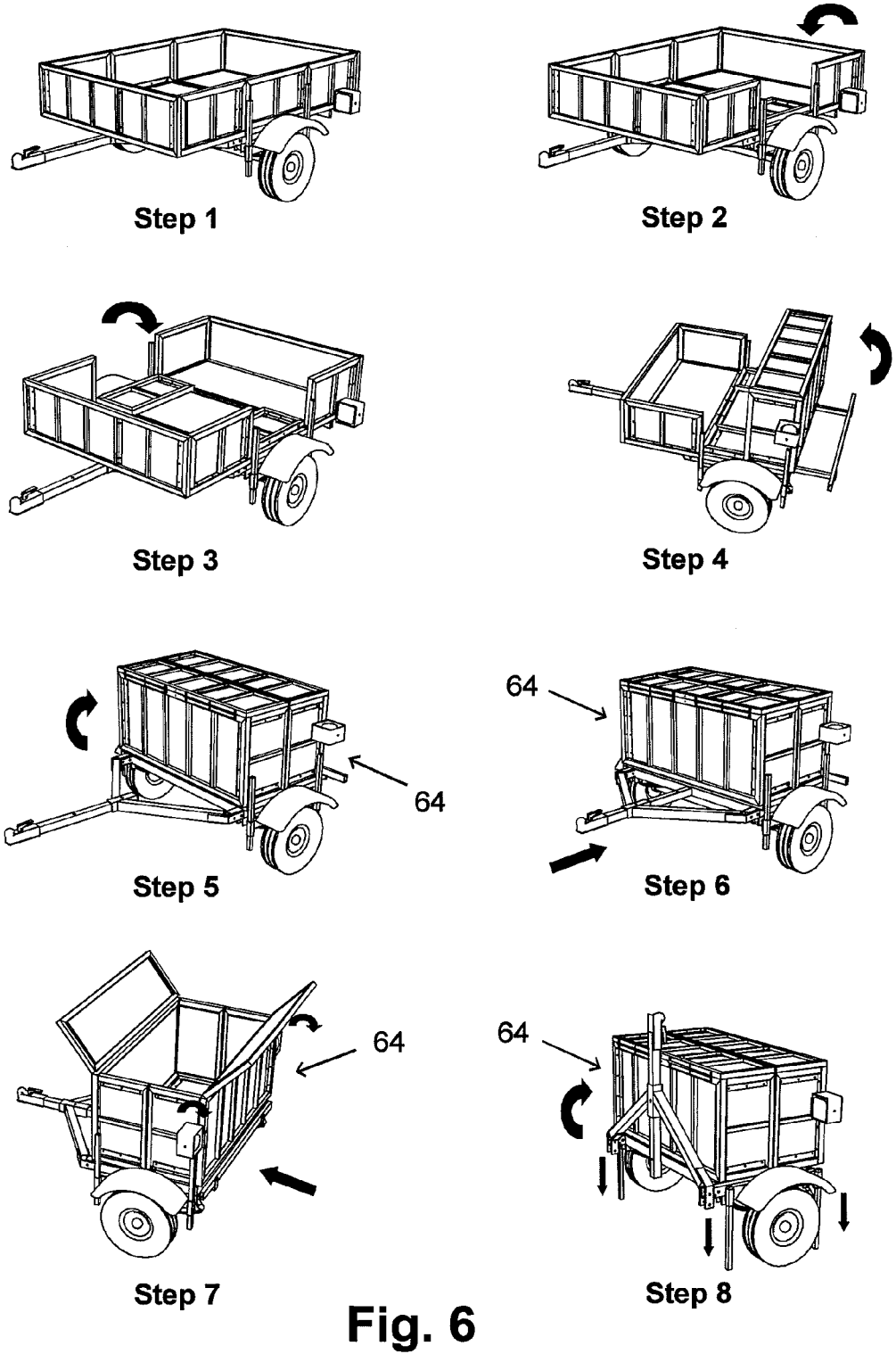
FIG. 6 represents diagrammatic perspective views illustrating the steps involved in the conversion of a trailer accord-

Reference to FIG. 6 shows the sequence of steps followed in shortening and, subsequently, storing the trailer.

At steps 5 to 7, the shorter trailer 64 has a bed of about ⅓ the length of the full longer trailer. Step 7 shows the opened top of trailer 64, while step 8 shows the fully folded trailer occupying minimal area.

Although this disclosure has described and illustrated certain preferred embodiments of the invention, it is to be understood that the invention is not restricted to those particular embodiments. Rather, the invention includes all embodiments which are functional or mechanical equivalence of the specific embodiments and features that have been described and illustrated.

The invention claimed is:

1. A collapsible foldable utility trailer for the transportation and/or storage of objects, said trailer comprising
a supporting chassis frame;
suspension means for supporting said chassis frame;
bed means retained upon said chassis frame for receiving said objects and comprising a plurality of bed sections comprising
(a) a first bed section having
i) a first planar bed member for receiving an object thereupon;
ii) a pair of opposing first bed side walls mounted on said first bed member;
(b) a second bed section having
i) a second planar bed member for receiving an object thereupon;
ii) a pair of opposing second bed side walls mounted on said second bed member, wherein said second bed sidewalls have inner vertical edges;
iii) a second bed end wall mounted to said second bed member between said pair of opposing second bed side walls;
wherein said second planar bed member is hingedly connected between said pair of opposing second bed side walls to said first planar bed member between said pair of opposing first bed side walls to allow 90° rotation of said second bed section to effect abutment of said second bed sidewalls inner vertical edges with said first bed section first planar bed member, and
wherein said pair of opposing first bed side walls are hingedly mounted on said first bed member as to be operably rotatable 90° to effect said first bed side walls in full abutment with and upon said first planar bed member.

2. A trailer as claimed in claim 1 wherein said bed means comprises
(c) a third bed section having
i) a third planar bed member for receiving an object thereupon;
ii) a pair of opposing third bed side walls mounted on said third bed member, wherein said third bed sidewalls have inner vertical edges;
iii) a third bed end wall mounted to said third bed member between said pair of opposing third bed sidewalls;
wherein said third planar bed member is hingedly connected between said pair of opposing third bed side walls to said first planar bed member between said pair of opposing first bed side walls to allow 90° rotation of said third bed section to effect abutment of said third bed sidewalls inner vertical edges with said first bed section first planar bed member.

3. A trailer as claimed in claim 1 comprising
a traction frame connected to said chassis frame and connectable to transport means by which said trailer is operably moved.

4. A trailer as claimed in claim 3 wherein said traction frame comprises retractable, telescopic means.

5. A trailer as claimed in claim 1 wherein said suspension means comprises biasing means, axle means and wheels.

6. A trailer as claimed in claim 1 wherein said chassis frame comprises
a main support frame and an extension support frame retractable within said main support frame
wherein said first bed section is retained on said main support frame and said second bed section is retained (i) on said extension support frame when said trailer is in an extended mode; and (ii) is retained on said main support frame when in a collapsed mode.

7. A trailer as claimed in claim 1 wherein said second bed end wall constitutes (i) the rear end of said trailer when said trailer is in an extended mode; and (ii) comprises an operable top of said trailer when said trailer is in a collapsed mode.

8. A trailer as claimed in claim 2 wherein said third bed end wall constitutes (i) the front end of said trailer when said trailer is in an extended mode; and (ii) comprises an operable top of said trailer when said trailer is in a collapsed mode.

* * * * *